(No Model.)
N. NILSON.
AUTOMATIC STEAM TRAP.
No. 556,366. Patented Mar. 17, 1896.
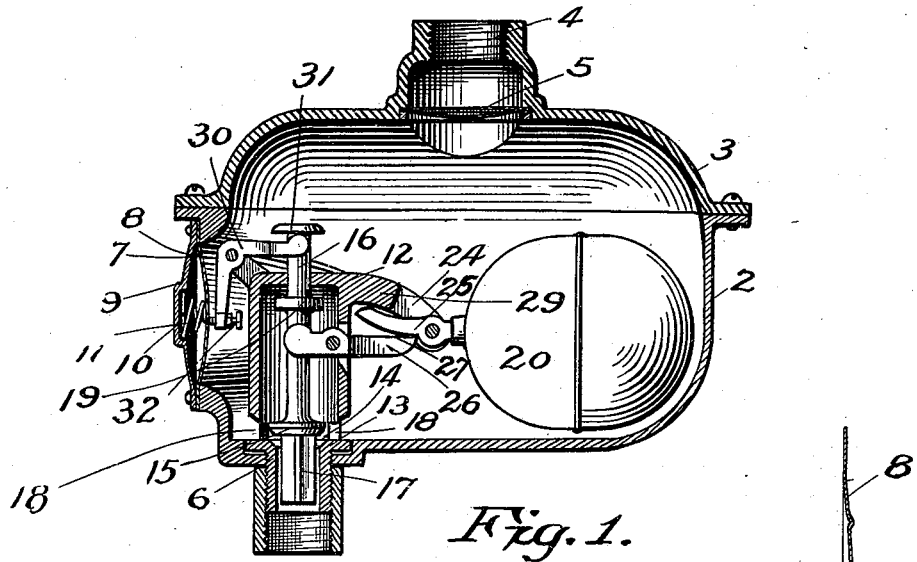
Fig. 1.
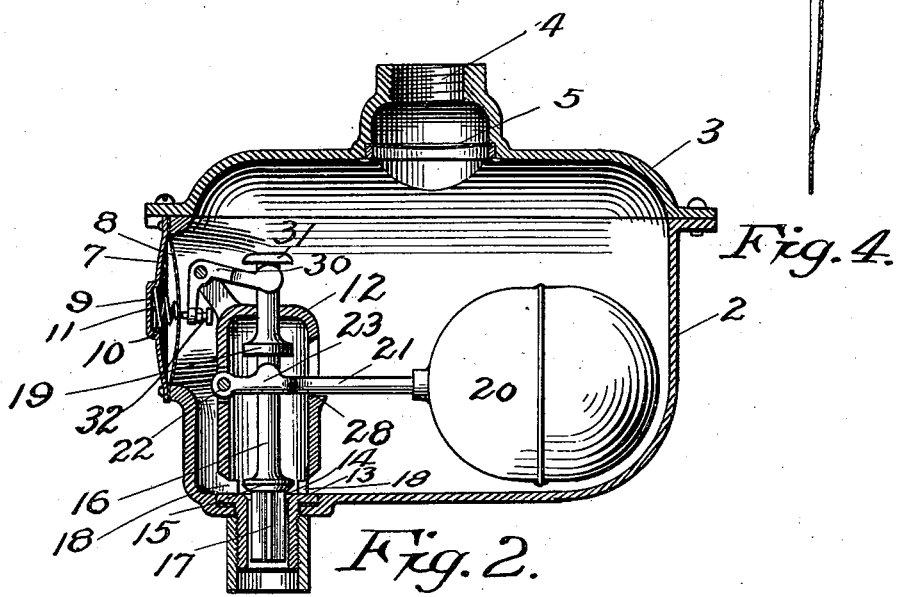
Fig. 2.
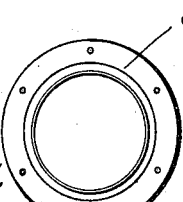
Fig. 3.
Fig. 4.
Witnesses:
Inventor;
Nils Nilson.
By Paul O. Hawley
his Attorneys

UNITED STATES PATENT OFFICE.

NILS NILSON, OF MINNEAPOLIS, MINNESOTA.

AUTOMATIC STEAM-TRAP.

SPECIFICATION forming part of Letters Patent No. 556,366, dated March 17, 1896.

Application filed February 6, 1895. Serial No. 537,455. (No model.)

*To all whom it may concern:*

Be it known that I, NILS NILSON, of the city of Minneapolis, county of Hennepin, State of Minnesota, have invented a certain new and improved Automatic Steam-Trap, of which the following is a specification.

My invention relates to automatic steam-traps designed to catch or collect and dispose of the water of condensation without wastage of steam.

The object which I have in view is to provide a steam-trap of an extremely simple and economical construction, one which will be thoroughly reliable in its action, and, further, one which, if desired, may be made to operate against a much higher pressure of steam than the ordinary traps hitherto designed.

To these ends my invention consists in an automatic steam-trap comprising a suitable casing or trap proper, a valve therein, a valve-lever and float to operate thereon, and a diaphragm which will operate to permit the valve to close when pressure exists in the trap, but will act to open said valve when the pressure is relieved.

My invention further consists in a peculiar system of levers or coupling between the float and the valve, whereby the valve is adapted to open against the pressure which is ordinarily deemed excessive; and, further, my invention consists in various details of construction and in combinations of parts, all as hereinafter described and particularly pointed out in the claims.

The invention will be more readily understood by reference to the accompanying drawings, forming part of this specification, and in which—

Figure 1 is a vertical longitudinal section of a steam-trap embodying my invention. Fig. 2 is a similar sectional view, but showing a simple float-lever. Fig. 3 is a face view of the diaphragm removed. Fig. 4 is an enlarged cross-section of the diaphragm.

As shown in the drawings, the trap proper is made up of the lower and upper parts 2 and 3, respectively, the same having flanges which are suitably secured together, and the upper part provided with the steam-inlet 4, beneath which is a suitable strainer 5. The lower part is provided with an opening 6 in its bottom and with a larger opening 7 in its end. The wall edges around this opening are faced to receive the thin metal diaphragm 8, which is normally sprung inward, and outside of which is a limiting-disk 9, preferably provided with a central pocket 10 adapted to retain in place a spring 11, itself adapted to distend the diaphragm. Within the trap I preferably provide a suitable inner casing 12, upon which the parts necessarily accompanying the valve are supported. The lower part of this casing has the sleeve 13 extending down through the opening in the bottom of the part 2, and in the top of this sleeve is the valve-seat 14, wherein a valve-disk 15 is adapted to close. The disk is provided with a stem 16 and is held centrally in place in an opening in the top of the inner casing 12 and by the wings 17 extending from the bottom of the disk. In the lower part of the casing I provide the openings 18, and the bottom of the casing above the sleeve part is preferably flush with the bottom of the trap proper, so that when the valve is open the trap will be completely drained of water. Any suitable means may be provided for securing the inner casing in place which holds the other parts.

Within the casing 12 the stem is provided with a collar or lug 19, with which the float-actuated lever is adapted to engage to lift the valve-disk from its seat when the float is raised by an accumulation of water in the trap. In low-pressure traps the float 20 may have a simple lever 21 extending through the part 12 and pivoted at 22 in the opposite side thereof. The end of the lever is preferably in the form of a yoke, on each side of which is an upwardly-extending lug 23. In this case the buoyant power of the float when raised in the trap will be sufficient to overcome the power of a low pressure upon the seated disk.

In order to render the device capable of operating against a much higher pressure of steam and yet confine the trap and the float to reasonable sizes, I may employ the compound lever between the float and the valve-stem. Such a device is shown in Fig. 1, wherein 24 represents an arm extending from the inner part 12, and wherein the float-lever 25 is pivoted at an intermediate point close to the float.

26 represents a short lever pivoted in the walls of the part 12 and having an end adapted to engage the collar on the stem, while its other end has a straight upper surface 27 extending into normal engagement with the part 25 at a point close to the pivot. A short arm of one lever thus operates upon the long arm of the lever 26, thereby giving the float greater advantages in the exertion of its power. To accomplish this result it is necessary to curve the outer end of the arm 25 upwardly, as shown, so that as the float rises the points of engagement between the two levers change and advance. Further, the disk will be started slowly from its seat and then lifted quickly through the remaining distance, the ratios of leverage changing rapidly as the float rises.

Limiting-stops 29 are preferably provided for the float-levers in the two traps, respectively. With either of these float attachments the valve may be raised to allow water to flow from the trap while pressure exists therein; but neither would open the valve if the greater part of the water was discharged and all pressure relieved, as when steam is cut off. It is therefore necessary to provide automatic means for opening the valve at such times, to the end that a trap may be completely drained. For this purpose I provide a suitable lever, preferably a bell-crank 30, between the diaphragm, and a collar or head 31 on the upper end of the stem, preferably pivoting said lever upon the part 12. In the lower arm of the bell-crank an adjusting-screw 32 is provided, whereby the parts removable with the inner casing 12 may be readily adjusted to the outer parts and the diaphragm, the adjustment being such that when the diaphragm is free and held inwardly by the spring 11 the bell-crank will be raised to support the valve, which being open will permit the draining of all water into the trap, and, further, which will drip into the same after steam is cut off. When steam enters the trap, however, the diaphragm will be forced outwardly against the limiting part 9, thereby permitting the bell-crank to lower, whereupon the valve-disk will be instantly forced upon its seat by the pressure upon its top. On the other hand, when the pressure is relieved the diaphragm will be returned by its spring 11, and the bell-crank being thereby forced inwardly will at once raise and open the valve and support the same in such position.

Having thus described my invention, I claim as new and desire to secure by Letters Patent—

1. The combination, in a steam-trap, of the trap proper, a valve provided therein, a float arranged in the trap proper and adapted to open said valve upon the accumulation of water in the trap, and a diaphragm provided in the wall of the trap, means for limiting the outward movement thereof, and a lever provided between said diaphragm and said valve and adapted to float said diaphragm, whereby upon the distention of the diaphragm the valve is permitted to close and upon the return of the diaphragm the valve opens, substantially as described.

2. In a steam-trap, the combination with the casing having the inlet and outlet openings, of the valve arranged therein, and adapted to close said outlet-opening, the inner casing surrounding said valve and provided with ports or openings, the lever pivotally supported within an opening provided in the wall of said inner casing, and extending into engagement with the stem of said valve, a second lever also pivotally supported and having one end in engagement with the outer end of said first-named lever, and a float provided upon the opposite end of said second lever whereby the accumulated water in the trap will raise said float and actuate said first-named lever and open said valve substantially as described and for the purpose set forth.

In testimony whereof I have hereunto set my hand this 23d day of January, A. D. 1895.

NILS NILSON.

In presence of—
FREDERICK S. LYON,
RICHARD PAUL.